(12) United States Patent
Kuehl, II

(10) Patent No.: US 7,614,306 B2
(45) Date of Patent: Nov. 10, 2009

(54) STRESS MONITORING SYSTEM FOR VIBRATOR SCREEN UNITS

(75) Inventor: Ronald D. Kuehl, II, Blythewood, SC (US)

(73) Assignee: Metso Minerals Industries, Inc., Waukesha, WI (US)

(*) Notice: Subject to any disclaimer, the term of this patent is extended or adjusted under 35 U.S.C. 154(b) by 42 days.

(21) Appl. No.: 11/821,973

(22) Filed: Jun. 26, 2007

(65) Prior Publication Data

US 2009/0000384 A1      Jan. 1, 2009

(51) Int. Cl.
*G01H 17/00* (2006.01)
(52) U.S. Cl. ....................................... 73/649
(58) Field of Classification Search .................. 73/579, 73/763, 774, 649, 662, 663
See application file for complete search history.

(56) References Cited

U.S. PATENT DOCUMENTS

| 5,255,565 A | 10/1993 | Judd et al. |
| 5,614,094 A | 3/1997 | Deister et al. |
| 7,025,210 B2 | 4/2006 | Mooney |

*Primary Examiner*—Andre J Allen
*Assistant Examiner*—Freddie Kirkland, III
(74) *Attorney, Agent, or Firm*—Greer, Burns & Crain, Ltd.

(57) ABSTRACT

A stress monitoring system for use in a vibrating unit having first and second opposed sidewall plates includes at least one motion sensor disposed at at least one corresponding monitoring point on each of the first and second plates. The motion sensors are connected to a processor such that simultaneous monitoring data of the monitoring points is provided to the processor for comparing real-time movement of the corresponding monitoring points of the opposed plates.

12 Claims, 5 Drawing Sheets

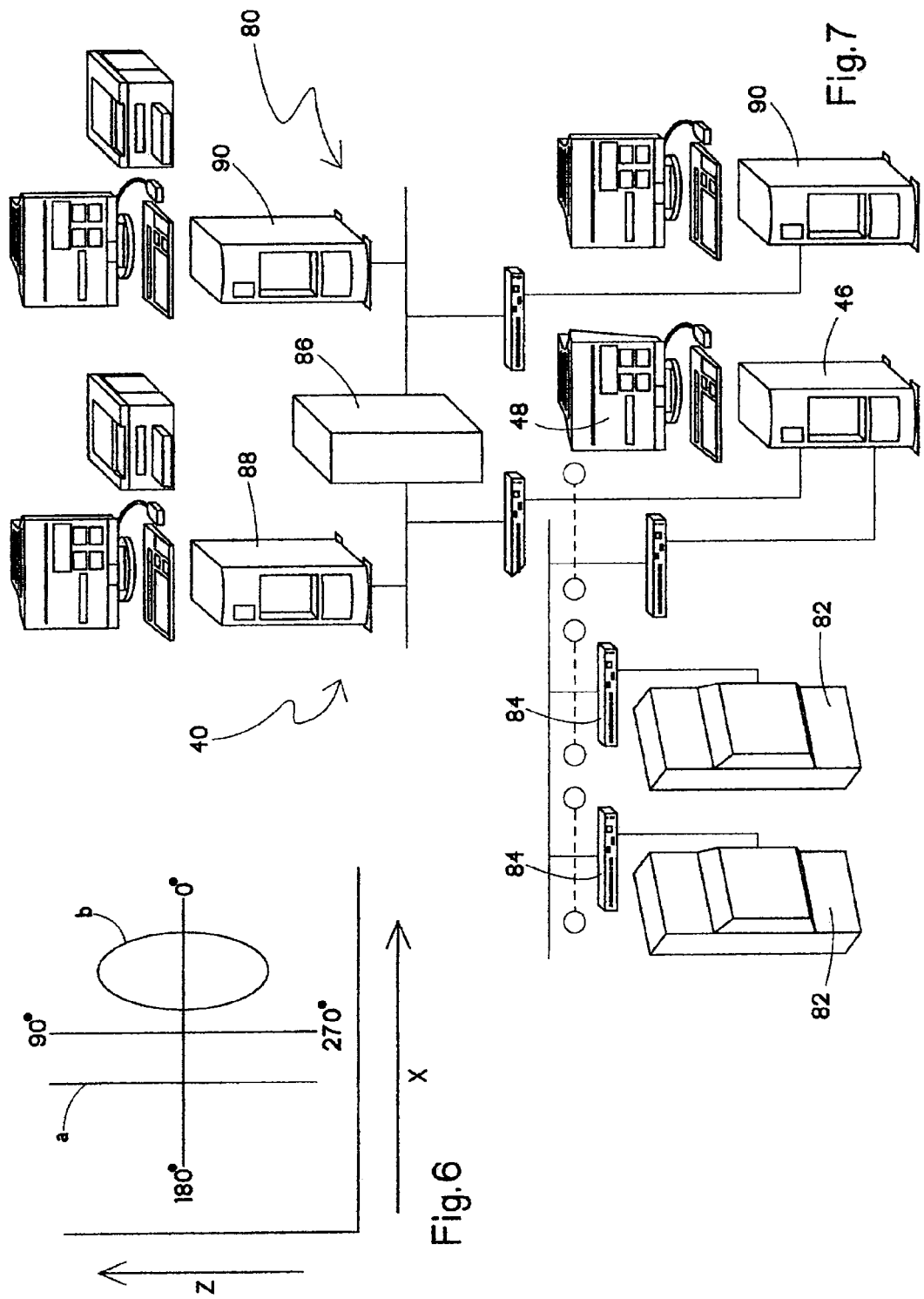

STRESS MONITORING SYSTEM FOR VIBRATOR SCREEN UNITS

BACKGROUND OF THE INVENTION

The present invention relates generally to vibrating equipment used for material processing, such as vibrator screen units used for separating or classifying particulate feed material as to size, and more particularly to a system for facilitating the designing, building and maintenance of such screen units by monitoring operational stress forces.

Vibrator screen units are well known for separating particulate feed material into various size classes. Such units include a pair of separated, generally vertical sidewalls or plates which support at least one and preferably several transversely positioned decks of apertured screening material. When multiple screening decks are provided, the upper screen materials have larger openings than those below. Upon generation of a generally vertical vibrating motion, particles fed to the decks are caused to bounce so that smaller-sized particles fall through the openings in the screen material, and larger-sized particles remain upon the deck. Using multiple decks, operators are able to generate a product of classified material in several size ranges.

Such screen units are designed with a specified amplitude and velocity, which is a function of the configuration of the plates, the size and type of the vibration generating device, the orientation of the plates and/or the screen decks, and fabrication and assembly techniques, among other factors well known in the art of designing and manufacturing such units. As a result, screen units of a particular model typically develop a fairly predictable system frequency upon operation, with individual units of a particular design developing small variations in system frequency from the model/design parameters. Over time, the system frequency of an individual unit often changes, influencing longevity and productivity. Designers attempt to design vibrating units so that they operate as far from the system frequency as practical while still maintaining desired production rates.

In the designing of such units, it is desired that the plates move synchronously, so that the screen decks are vibrated uniformly across the length of the deck. This synchrony not only enhances the classifying performance of the unit, it also prolongs operational life of the screen unit. When plates are not in synch, operationally-generated forces cause stress, among other places to attachment joints between the screen decks and the plates, and between the plates and laterally projecting spring mounts. Imbalanced units have shorter operational lives, require more frequent maintenance, and/or have less efficient classification performance.

Conventional vibrating screen units are provided with plates made of steel in the range of 0.3125 to 0.75 inch thick, which is strong in the axial direction. However, the plates are relatively thin in view of the production loads and work performed, and are susceptible to racking or twisting forces along the z-axis. Potentially damaging operational forces in vibrator screen units are caused, among other factors, by uneven or misaligned springs, uneven foundation mounts, improper vibrating speed, improperly installed screen decks, worn bushings and/or imbalanced flywheels on the vibration generator. Due to the wide variety of potential causes for vibrator unit malfunction, it is difficult for the average operator to detect when a unit is not operating according to its design parameters. It is even more difficult for the average operator to accurately diagnose the cause of the malfunction.

Conventional techniques for monitoring plate movement include the fastening of paper throw cards to the plates at designated locations, typically near the inlet and discharge ends of the unit, and near the vibration generator. Ideally the cards are mounted at corresponding locations on each plate at a corresponding end of the unit. However, due to the harsh operational environment of the vibrator unit (quarry, mine, gravel plant, road building site, etc.) and the variations in operator training, very often the cards on each plate at a designated machine are not properly placed for accurate results. An individual applies a pencil or similar marking instrument while attempting to hold his hands steady against the card while the unit is operating, and a pattern is generated by the unit, which varies by the style of unit involved. Typical patterns include ellipses, straight lines and circles. Upon drawing at least one trace or curve, or preferably a series of traces at one monitoring point, the user then moves to a corresponding card at another monitoring point on the machine and produces another trace or set of traces. Next, the traces of the respective plates at the same location are visually compared as to their two-dimensional (x and y-axes) similarity. If the patterns are angularly skewed, show blurred lines or are vertically or horizontally displaced beyond a designated range, the unit is judged to be out of synch, requiring modification of the plates or screen deck fasteners, change of speed of the vibration generating device or the device itself, or other modifications known to skilled practitioners to bring the traced patterns within acceptable degrees of similarity.

While the use of throw cards is the accepted technique for monitoring the operation of vibrator units, a significant drawback of this technique is that it is subjective, one cause being that the pressure applied by individuals varies, influencing the results. Some operators are anxious about standing next to the unit vibrating in the range of 900 rpm. As a result, the pressure applied by the user may vary, as well as the angle of the pencil to the throw card. Further, if the operator's hand moves while marking on the card, or if he shifts his weight or moves his feet, the results will vary. Such variation may apply on a card-to-card basis by a single operator, due to fatigue or subtle variations in stance or pressure at various points on the machine, and such variations increase when operator-to-operator technique is compared. On large-sized vibrator units, some points on the machine are too high to reach when standing, and due to instability, ladders are not placed against vibrating machines. Thus, on larger units, some technically desired sampling points are not practically monitorable and are virtually inaccessible.

To combat this variation on units where access is available, it is recommended that the same individual monitors each plate at each designated point on a particular vibrator unit at a sampling event. Due to this procedure, since the same individual can only monitor one location at a time, the sampling is temporally displaced for each monitoring point on respective plates. Even when the same individual performs the monitoring on a designated unit, the other variables listed above typically combine to create a great degree of subjectivity in the curves or plots generated. As such, many operators rely on specially trained vibrator unit technicians who periodically monitor the units for performance. Such technicians are trained to avoid the above-listed variables in card throw techniques; however while more accurate than average, their throw card data is still somewhat subjective. Also, as may be appreciated, there is limited availability of such technicians, who are also trained to diagnose the causes of substandard throw card curves or plots and their remedies.

Another drawback of the conventional throw card technique is that the monitoring is two-dimensional only, in the x and y-axes. Other than when a portion of a drawn curve is missing in one location or portion, indicating lateral motion of the unit, this conventional technique is incapable of accurately monitoring side-to-side (z-axis) movement of the unit. Such movement is an important indicator of plate asynchrony, due to the susceptibility of the plates to damage or accelerated wear caused by imbalanced forces acting in this direction. In view of the many causes for variation, it is estimated that as much as 70-80% of conventional throw card data is suspect.

In an effort to objectify the monitoring of plate movement using throw cards, some vibrator unit technicians have explored the use of accelerometers placed at desired unit monitoring locations. The accelerometers are positioned to monitor movement in the x and y-axes in similar locations to the placement of throw cards, and are electrically connected to a hand held device which plots appropriate curves. On a typical screen unit, pairs of accelerometers are placed at respective corners of the unit. Accelerometers have also been placed to monitor the bearing condition of the vibration generator. However, while this technique generates more objective data, conventional monitoring equipment has been designed to monitor data from one point on one plate at a time, and comparisons are typically restricted to a two-dimensional format (x and y-axes). While the implementation of accelerometers as discussed above shows promise in obtaining more objective and reliable vibrator unit performance data, the performance of vibrator screen units is very dynamic, and changes constantly with the volume and or type of material being screened. Thus, even the above-described technique involves inherent variability.

Thus, there is a need for an improved system for monitoring vibrator screen unit operation on a plate-by-plate basis to obtain more accurate data, even on larger vibrator units. There is also a need for an improved system for monitoring operational stresses on vibrator screen units which accounts for the dynamic nature of machine operation.

BRIEF SUMMARY OF THE INVENTION

The above-described needs are met or exceeded by the present stress monitoring system for vibrating equipment in general, and more specifically to vibrator screen units. Features of the present system include simultaneous or real-time monitoring of both plates at designated points. By providing simultaneous monitoring, dynamic changes in operation are accounted for. Also, plate-to-plate performance variations are more accurately measured. Another feature of the present system is that simultaneous monitoring is provided at each plate in the z-axis to monitor side-to-side machine movement often indicative of asynchronous or imbalanced operation. The present system provides superimposed plate-to-plate performance curves so that performance curve variations are more readily observed and compared with designated acceptable variations. Also, data from monitored machines is available for remote monitoring by operators and/or machine manufacturers or dealers. As a unit ages, monitoring continues so that adjustments to the unit are made to stay clear of the changing system frequencies.

More specifically, the present stress monitoring system for a vibrating unit having first and second opposed sidewall plates includes at least one motion sensor disposed at least one corresponding monitoring point on each of the first and second plates. The motion sensors are connected to a processor such that simultaneous monitoring data of the monitoring points is provided to the processor for comparing real-time movement of the corresponding monitoring points on the opposed plates.

In another embodiment, a stress monitoring system for use in a vibrator screen unit having first and second opposed sidewall plates with at least one screen deck transversely mounted therebetween, includes at least one motion sensor disposed at corresponding monitoring points on each of the first and second plates, the motion sensors being connected to a processor with a display such that simultaneous monitoring data of the monitoring points is provided to the processor for comparing real-time movement of corresponding locations of the opposed plates.

BRIEF DESCRIPTION OF THE SEVERAL VIEWS OF THE DRAWINGS

FIG. 6 is a schematic representation of data display of vibrator performance in the x and z-axes; and FIG. 7 is a schematic representation of a computerized machine monitoring network employing the present stress testing system.

DETAILED DESCRIPTION OF THE INVENTION

Figure 1:
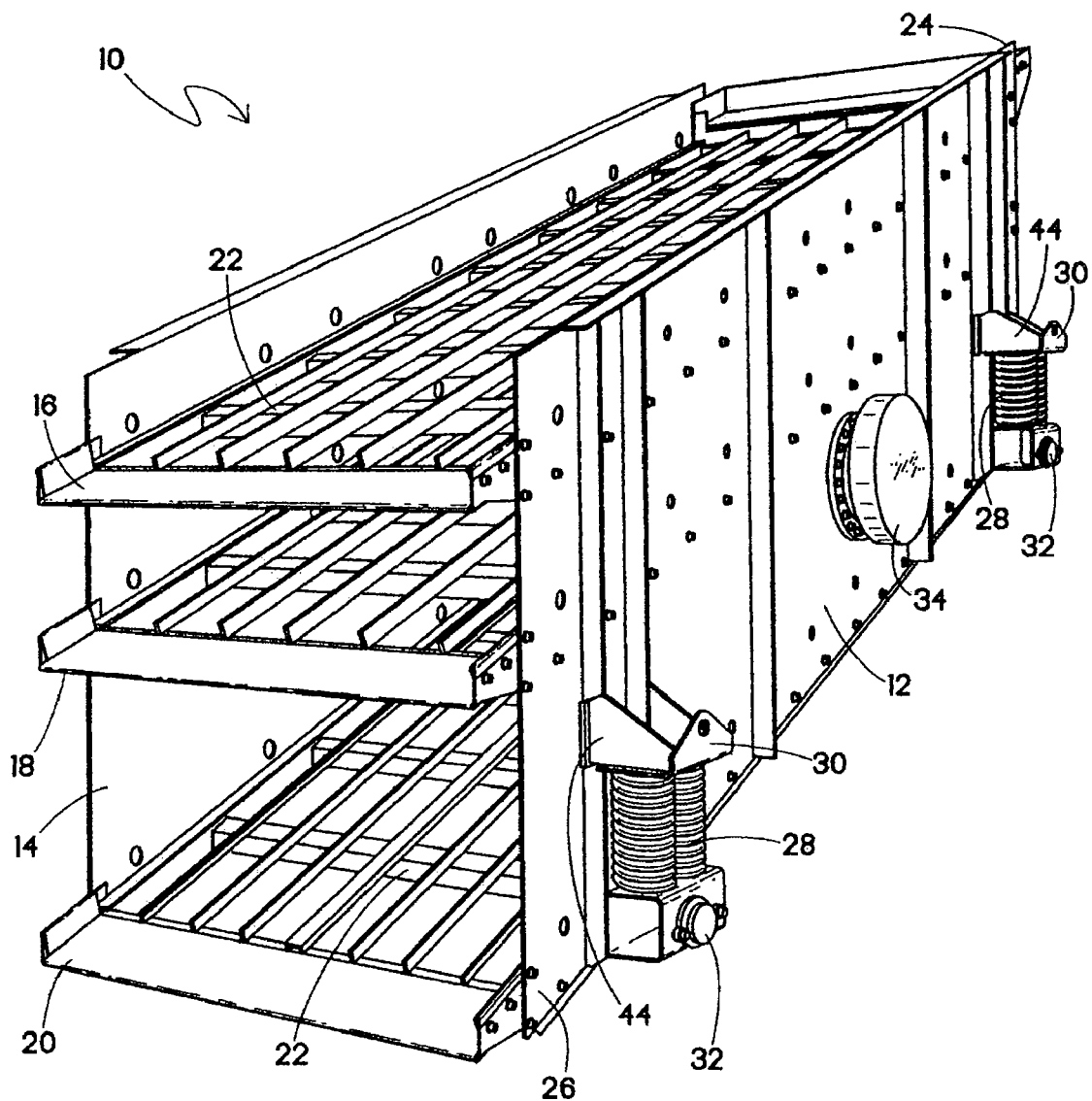
FIG. 1 is a front perspective view of a vibrator screen unit suitable for use with the present monitoring system.

Referring now to FIG. 1, a vibrating unit of the type suitable for use with the present system is generally designated 10 and is depicted as a vibrator screen unit; however it will be appreciated that other types of vibrating equipment having opposed sidewalls are considered to benefit from the present system. As is well known in the art, the vibrator unit 10 includes a first sidewall or plate 12 and a second sidewall or plate 14 disposed in spaced, parallel orientation to the first plate and being separated by at least one transversely disposed screen deck 16. Most such units 10 are provided with multiple screen decks, here depicted as second and third decks 18 and 20 respectively. The uppermost screen deck 16 has a relatively coarser mesh screen fabric (not shown) or larger apertures. Progressing toward the third deck 20, the mesh pattern becomes finer for retaining relatively smaller particles. The selection of mesh sizes for the decks 16, 18 and 20 is a function of the product material desired by the operator. Transverse support beams or tubes 22 are attached to inside walls of each plate 12, 14, support the screen decks 16, 18 and 20 and also maintain spacing between the plates.

The unit 10 has a feed end 24 and a discharge end 26, with the feed end sometimes being disposed at a higher elevation than the discharge end to promote gravity flow of classified particulate material. At least one coiled compressible spring 28 is located adjacent the corresponding feed and discharge ends 24, 26 of each plate 12, 14 to provide a resilient suspension at each of the four corners of the unit 10. The springs 28 are typically provided in clusters of at least two and are disposed between upper mounting points or flanges 30 affixed to the corresponding plates 12, 14, and lower mounting points or bases 32 are connected to a stationary machine mount or foundation or alternatively a mobile processing unit, so that the unit 10 is resiliently mounted to the substrate. A motion generator, such as a powered flywheel, eccentric or the like is designated 34 and generates a cyclical movement of the unit 10 upon energization. Depending upon the type and construction of the unit 10, the movement created by the motion generator 34 causes the unit 10 to define a linear, elliptical or circular cyclical movement.

Given the relatively narrow spacing of the plates 12, 14 compared to the length of the unit 10, and the transverse support bars 22 being the main structural support of the unit, it will be understood that the unit is subject to vertical and/or horizontal racking or torque forces upon stress loading, particularly when large-sized and/or large volumes of particulate feed material are deposited upon the uppermost deck 16. The operational life of the unit 10 is in part a function of the degree of misalignment or disparity in movement between the plates 12, 14.

Figure 2:
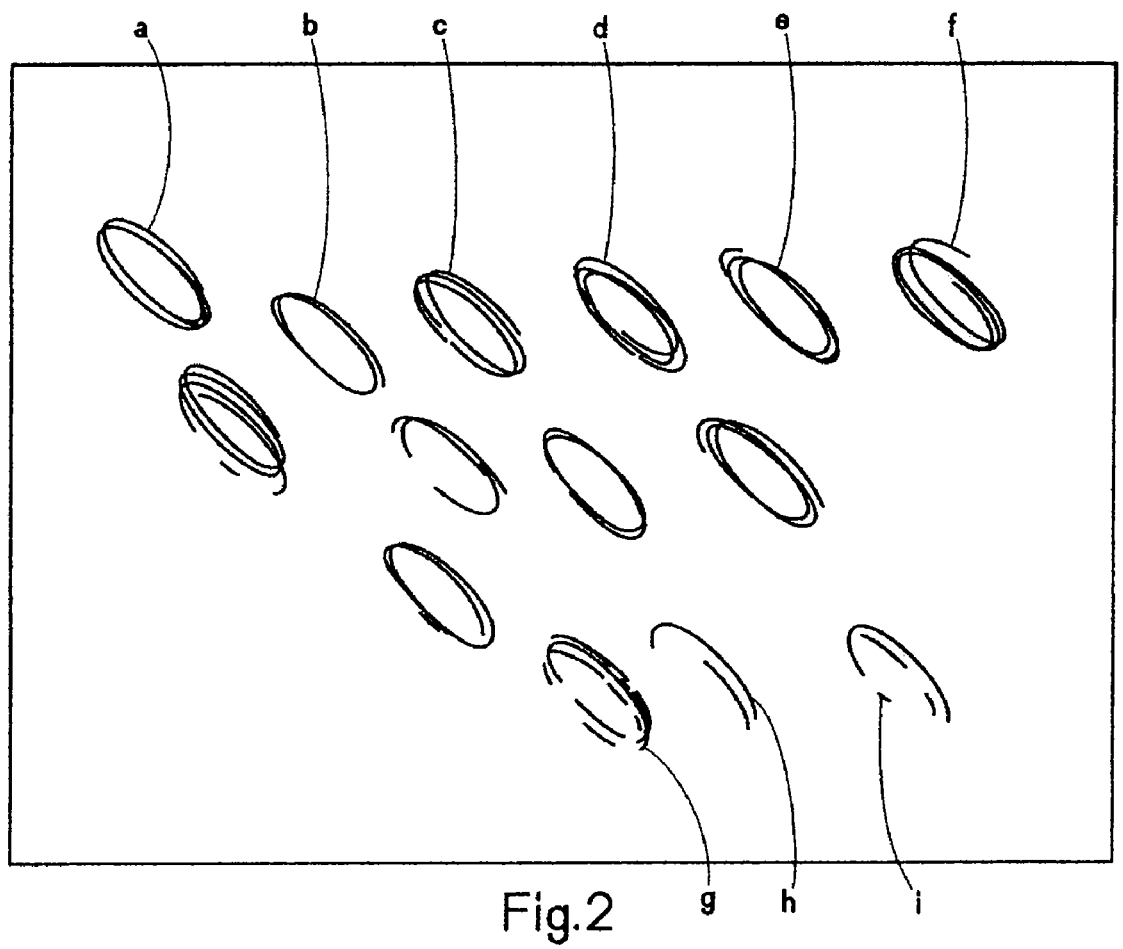
FIG. 2 is a schematic example of conventional throw curve data from a single location on a vibrator unit.

Referring now to FIG. 2, conventional throw card data is provided for a relatively small-sized flat screen-type vibrator unit similar to that depicted in FIG. 1. Variations are seen in the operator's application of pressure against the card, and movement of the operator or operator's hands during plotting. Variations across a lateral row of curves are readily seen. Curve 'a' shows the ellipses laterally skewed, indicating hand movement or also imbalanced machine springs. Curve 'b', taken on the same machine within seconds of the curve 'a', depicts relatively balanced operation, albeit at a reduced throw, since the length of the ellipse is indicative of machine throw. Curves 'c'-'f' depict similar variations. Curves 'g', 'h' and 'i' depict light operator hand pressure and/or hand movement, or are indicative of machine imbalance in the 'z' axis causing lateral cyclical movement.

Comparison of two such cards taken at each plate 12, 14 on a designated location on a target vibrator unit is made by overlying the cards, and selecting curves which appear similar in composition. However, the above-identified variations are magnified by operator technique by location on the machine and also in the selection of curve for comparison. Such curves superimposed upon each other are also variable as to the time delay in obtaining the data as well as the location on the machine.

Figure 3:
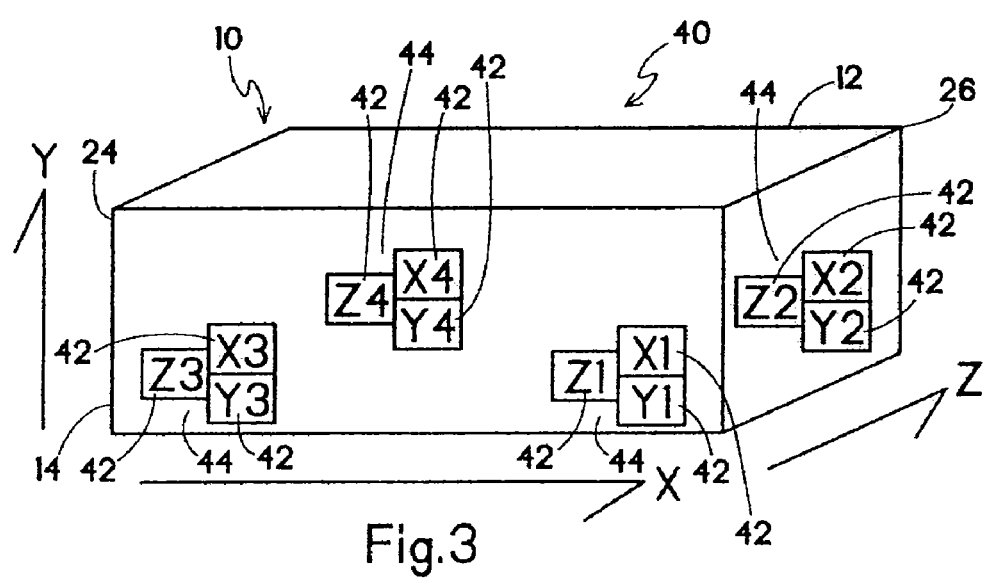
FIG. 3 is a schematic front perspective view of a suitable vibrator screen unit equipped with sensors used in the present system.

Referring now to FIGS. 1 and 3, the present stress monitoring system is generally designated 40 and includes at least one motion sensor 42, preferably an accelerometer; however other motion sensors are contemplated, disposed at least one monitoring point 44 on the unit 10. Preferably, the monitoring points 44 are identical corresponding locations on each of the plates 12, 14, and are located at the feed and discharge ends 24, 26 of each plate. While at least one motion sensor 42 is provided, it is preferred that at least two such sensors are disposed at each monitoring point 44 to monitor the x and y-orthogonal axes, and most preferably three such sensors are disposed at each monitoring point 44 to respectively measure movement in the x, y and z-axes. Thus, in a preferred system 40 there are at least eight and preferably twelve total sensors 42.

The sensors 42 are connected to a processor 46 (FIG. 7) such as a computer, server or similar unit capable of receiving, manipulating and transmitting data. Suitable software is available from Metso Automation (www.metsoautomation.com) under the designation Sensodec™. In the preferred embodiment, the processor 46 is provided with a display 48 for providing visually detectable performance curves of the unit 10 at the monitoring points 44 such that simultaneous monitoring data of the monitoring points is provided to the processor for comparing real-time movement of the corresponding monitoring points on the opposed plates.

Figure 4:
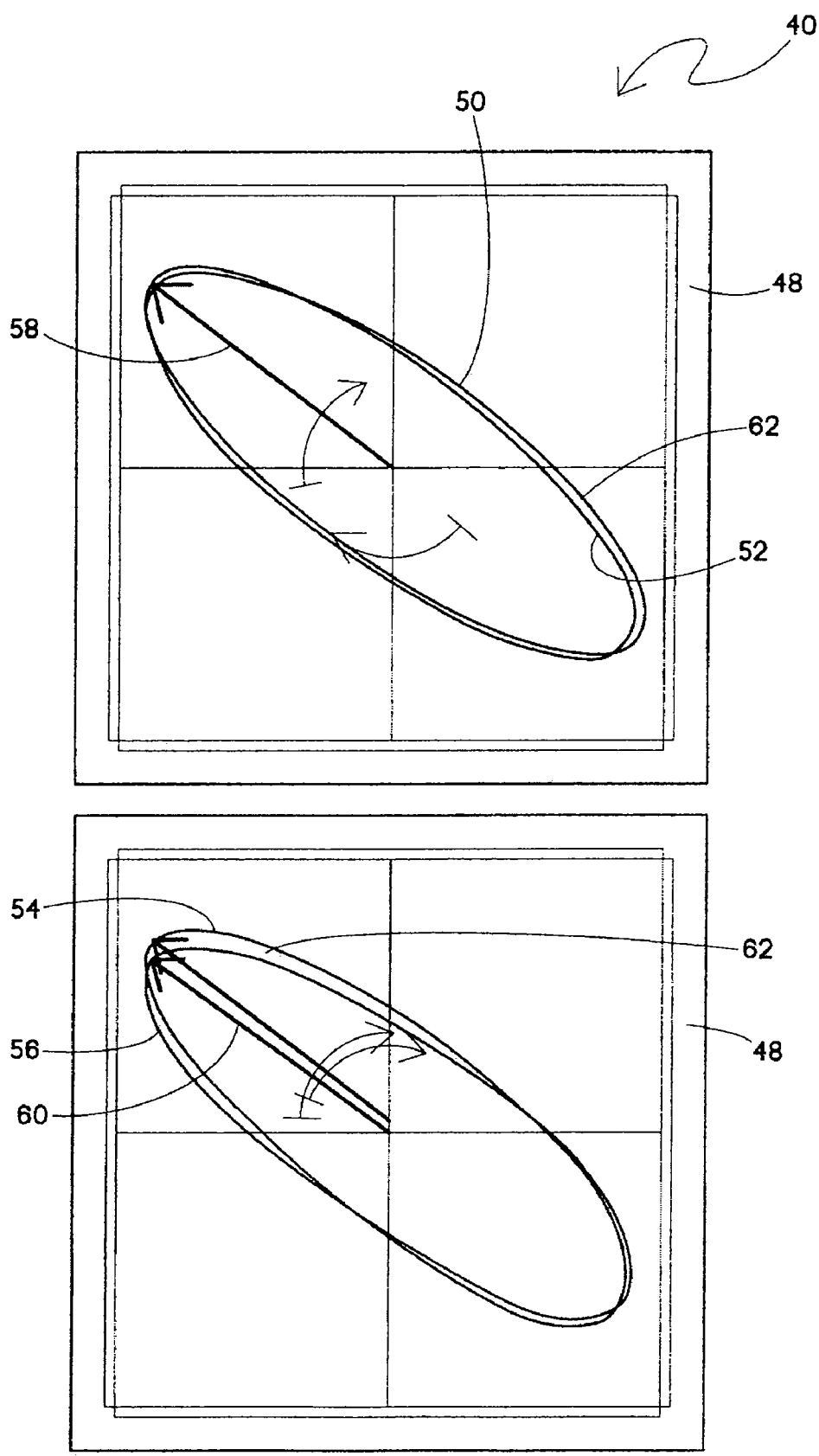
FIG. 4 is a schematic representation of data display overlays from simultaneous monitoring of various points on a designated vibrator screen unit.

Referring now to FIG. 4, using conventional software, data generated by the sensors 42 is converted by the processor 46 into curves or plots representing unit motion that are plotted on the display. FIG. 4 displays the elliptical trace of a so-called flat screen unit, similar to that depicted in FIG. 1. Plotted data are provided for the discharge end 26 and for the feed end 24. Discharge plots 50, 52 monitoring movement in two-dimensions (x and y-axes) are displayed for corresponding discharge end monitoring points 44a, 44b on each plate 12, 14. Similarly, feed plots 54, 56 are displayed for monitoring similar motion at corresponding feed end monitoring points 44c, 44d.

To enable the operator to determine whether the unit 10 is operating properly, the plots 50, 52, and 54, 56 are displayed in superimposed fashion. The data may be displayed in the form of the plots 50-56, and/or as calculated linear relationships, 58, 60. If the plates 12, 14 are operating out of synch, the plots will show areas of disparity 62. These areas 62 are the graphical representation of the operational stress being experienced by the unit 10 and being monitored by the system 40. Depending on the unit 10 and the particular circumstances, a certain amount of disparity between the plates 12, 14 may be acceptable. However, disparities beyond a designated threshold indicate that modifications to the unit 10 are in order to obtain more efficient production and to prolong the operational life of the unit. In FIG. 4, the discharge plots 50, 52 are determined to be in synch, while the feed plots 54, 56 have an excessive amount of disparity 62.

Figure 5:
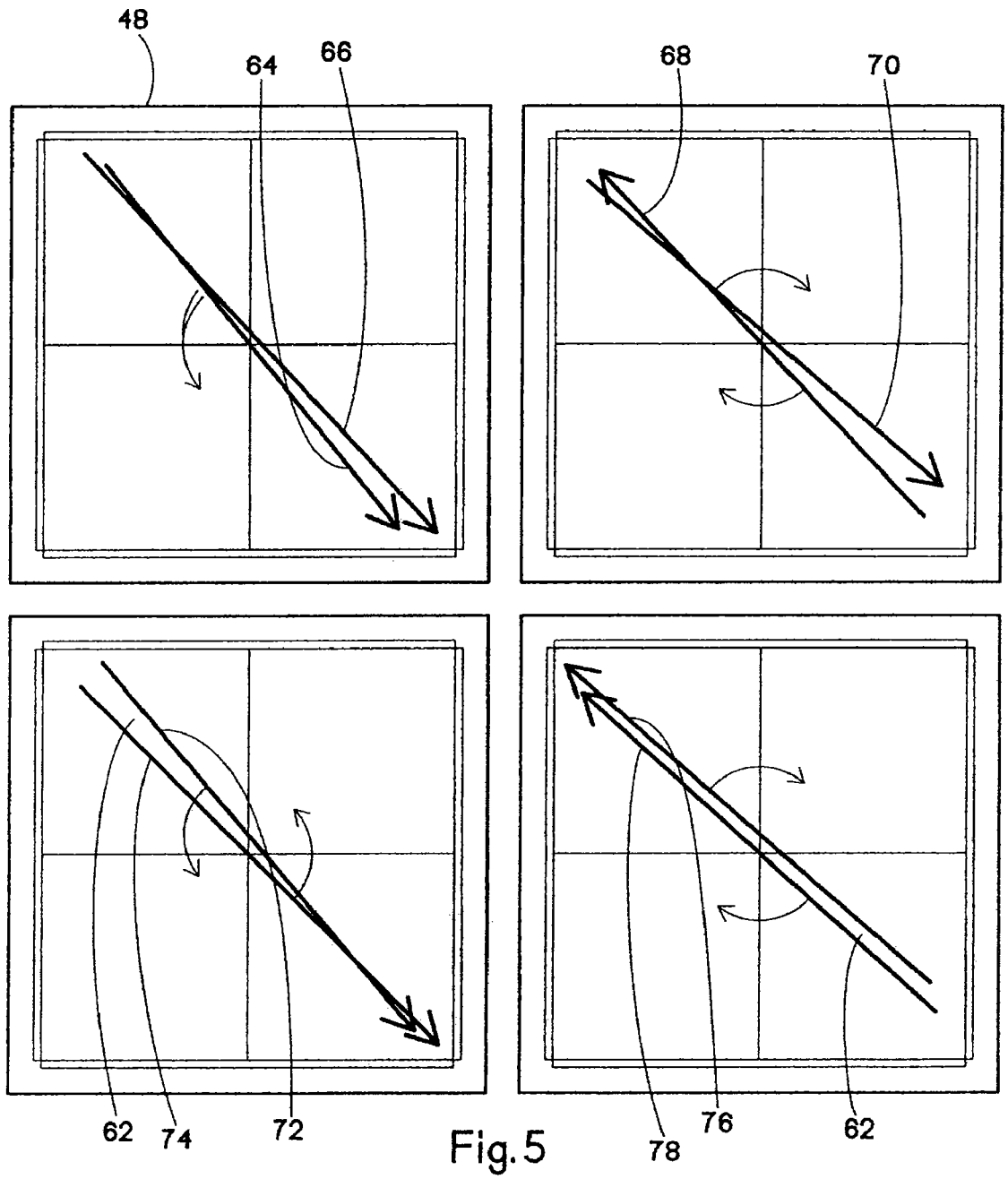
FIG. 5 is a schematic representation of data display overlays from simultaneous monitoring of various points on a second type of designated vibrator screen unit.

Referring now to FIG. 5, an exemplary display of eight monitoring points in two directions (x and y-axes) is shown for a so-called banana screen, having sloping arcuate decks as known in the art. Such screen units generate straight line discharge plots 64, 66 at a first discharge monitoring point 44, and discharge plots 68, 70 at a second discharge monitoring point. Similarly, feed plots 72, 74 are taken at a first feed monitoring point 44 and plots 76, 78 at a second feed monitoring point. It will be seen that the discharge plots, 64-70 are in synch, while one set of feed plots 72, 74 are out of synch, having an excessive amount of disparity 62. It will be appreciated that the amount of disparity 62 will vary with the application and the specific machine. An advantage of the present system 40 is that the monitoring of the various points 44 is performed simultaneously and the data is visible in real time, so that plate-to-plate variations can be determined more objectively and accurately under actual operating conditions than using conventional techniques.

Referring now to FIG. 6, a schematic display plot of the 'x' and 'z' axes is depicted, where in curve 'a' the machine is in alignment, while in curve 'b', the machine is out of alignment.

Referring now to FIG. 7, a data network suitable for collecting and analyzing data from units 10 through the system 40 is generally designated 80. The data generated by all of the monitoring points 44 of a particular unit is collected at a screen station 82 which is preferably a terminal box to which are connected the leads of each accelerometer. If there are multiple units 10 at a particular screening facility, multiple screen stations 82 are provided. Each screen station 82 is connected via typical network connections 84, either hard wired or broadband wireless as known in the art using a firewall 86 preferably of the VPN type (shown schematically). A central processing unit 88 is provided at a user's facility, and/or data may is optionally transmitted to similar processors 90 at a dealer and/or manufacturer facility, via telephone lines, wirelessly as known in the art. Thus operators and/or manufacturers are able to monitor unit performance in real time from multiple points on each unit.

While specific embodiments of the present stress monitoring system for vibrator screens have been shown and described, it will be appreciated by those skilled in the art that changes and modifications may be made thereto without departing from the invention in its broader aspects and as set forth in the following claims.

What is claimed is:

1. A stress monitoring system for use in a vibrating unit comprising:
    a vibrating unit including a first sidewall plate, a second opposing sidewall plate and at least one screen deck transversely mounted between said first and second sidewall plates, said first sidewall plate including at least a first monitoring point and said second sidewall plate including at least a second monitoring point, wherein said monitoring points are located at corresponding locations on said first and second sidewall plates;
    at least two motion sensors corresponding respectively to the x and y-axes disposed at each of said first and second monitoring points on said first and second sidewall plates, each of said at least two motion sensors being configured to monitor movement in one orthogonal axis;
    said at least two motion sensors on each of said first and second sidewall plates being connected to a processor such that simultaneous monitoring data of said first and second monitoring points in both said x and y-axes is provided to said processor for comparing real-time movement of said first and second monitoring points on said first and second sidewall plates.

2. The system of claim 1 wherein three motion sensors respectively corresponding to the x, y and z-axes are disposed at each of said first and second monitoring points, each of said three motion sensors being provided for monitoring movement in one orthogonal axis.

3. The system of claim 1 wherein said processor is provided with a display and said data from each of said first and second monitoring points displayed in superimposed fashion on said display for visually monitoring discrepancies between the first and second sidewall plates.

4. The system of claim 1 wherein at least one of said at least two motion sensors is an accelerometer.

5. The system of claim 1 further including providing a machine monitoring network, with each said processor connected to said network.

6. A stress monitoring system for use in a vibrator screen unit having first and second opposed sidewall plates with at least one screen deck transversely mounted therebetween, the first and second sidewall plates each including at least one corresponding monitoring point, the system comprising:
    at least two motion sensors corresponding respectively to the x and y-axes disposed at each of the at least one corresponding monitoring points on each of the first and second sidewall plates, each of said at least two motion sensors being configured to monitor movement in one orthogonal axis;
    said at least two motion sensors being connected to a processor with a display such that simultaneous monitoring data of said at least one corresponding monitoring point on the first and second sidewall plates in both said x and y-axes is provided to said processor for comparing real-time movement of the at least one corresponding monitoring points of the first and second sidewall plates and displayed on said display.

7. The system of claim 6 further including three motion sensors located at each of the monitoring points on the first and second sidewalls for monitoring motion in the x, y and z-axes.

8. The system of claim 7 wherein at least one of said three motion sensors is an accelerometer.

9. The system of claim 6 wherein said display is configured to display data from each of the monitoring points on the first and second sidewalls in superimposed fashion for visually monitoring motion discrepancies between the first and second sidewall plates.

10. A stress monitoring system for use in a vibrator screen unit operating under induced motion and having first and second opposed sidewall plates with at least one screen deck transversely mounted therebetween, the first and second sidewall plates each including at least one corresponding monitoring point, the system comprising:
    at least one motion sensor configured for monitoring at least the x and y-axes disposed at each monitoring point located on the first and second sidewall plates at corresponding locations;
    said at least one motion sensor being connected to a processor with a display such that simultaneous monitoring data collected from each monitoring point on the first and second sidewall plates in the x and y-axes is provided to said processor for comparing real-time relative movement of said plates at said corresponding locations, and said monitoring data being visible on said display.

11. The system of claim 10 wherein said data from the first and second monitoring points is displayed in superimposed fashion on said display for visually monitoring discrepancies between the first and second sidewall plates to evaluate the relative movement of the first and second sidewall plates.

12. The system of claim 10 wherein said at least one motion sensor is configured for monitoring movement in the x, y and z-axes at each of the first and second monitoring points.

* * * * *